Figure 1:
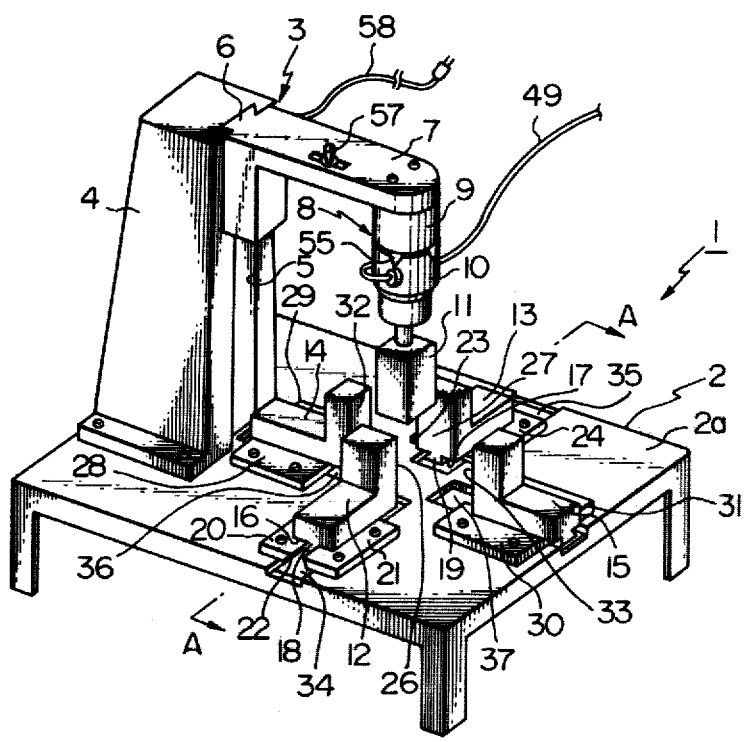

United States Patent [19]

Fujikawa

[11] 4,301,350
[45] Nov. 17, 1981

[54] PRESETTER

[75] Inventor: Misao Fujikawa, Yokohama, Japan

[73] Assignee: Sodick Co., Ltd., Yokohama, Japan

[21] Appl. No.: 110,576

[22] Filed: Jan. 9, 1980

[30] Foreign Application Priority Data

Feb. 6, 1979 [JP] Japan .............................. 54-13359[U]

[51] Int. Cl.³ .............................................. B23K 1/12
[52] U.S. Cl. ................................ 219/69 R; 219/69 E; 408/236
[58] Field of Search ........................... 219/69 E, 69 R; 269/242; 279/5; 408/187, 236

[56] References Cited

U.S. PATENT DOCUMENTS

| | | | |
|---|---|---|---|
| 2,366,519 | 1/1945 | Greenberg | 269/242 X |
| 2,881,645 | 4/1959 | Kruchten | 269/242 X |
| 2,922,022 | 1/1960 | Mironoff | 219/69 E |
| 3,271,848 | 9/1966 | Montandon | 219/69 E X |
| 3,594,537 | 7/1971 | Morgenegg | 219/69 E |
| 3,806,691 | 4/1974 | Roach | 219/69 R X |
| 3,949,185 | 4/1976 | Roach | 219/69 R |
| 3,963,893 | 6/1976 | Roach | 219/69 R |

Primary Examiner—Gene Z. Rubinson
Assistant Examiner—D. A. Tone
Attorney, Agent, or Firm—James C. Wray

[57] ABSTRACT

At least one pair of regulating blocks are provided on a base table so as to move on a major face of the base table in parallel therewith. Each of said pair of regulating blocks has a holding face with a regulating face so as to position a member to be adjusted in a desired angle. The member to be adjusted is held by the holding faces of the respective regulating blocks and, as a result, the member is positioned in the required angle following the regulating faces of the respective holding faces. With the so constructed device of the present invention, the member to be adjusted can be easily positioned with respect to its angle simply by holding the member by at least one regulating blocks.

4 Claims, 2 Drawing Figures

PRESETTER

This invention relates to a presetter employable for positioning various kinds of tools, and more particularly to a presetter suitable for an angular positioning of tools.

In general, to position tools to be mounted on machining apparatus, there is employed a measuring apparatus such as a dial gauge. For example, where the angular positioning of a machining electrode of an electrical discharge machining apparatus in the form of a square pillar is required to be mounted so that an axis of the electrode may be perpendicular to a major face of a workpiece, the positioning is conventionally carried out in the following method: first, the dial gauge is mounted on a free end of a flexible arm which is fixed at the other end and then a pickup portion of the dial gauge is adapted to press, by an appropriate force, a side face of the electrode. In this case, the electrode is fitted to a quill of the electrical discharge machining apparatus through a universal joint. In this state, the angular position of the electrode is adjusted by an operator so that a dial indication may be kept constant if the quill is moved up and down in a vertical direction, whereby the axis of the electrode is positioned in parallel with a vertical line. As can be understood from the above, the known positioning method of this type involves a complicated adjusting operation and it takes a considerable time and a skill. Therefore, in exchanging of the electrodes of the electrical discharge machining apparatus, such a positional adjusting operation takes much time, and as a result, an effective operating time of the electrical discharge machining is greatly reduced.

It is therefore an object of the present invention to provide a presetter which is capable of easily and quickly carrying out such a positional adjustment of a tool after it has been mounted.

It is a more specific object of the present invention to provide a presetter which enables simple and quick angular positioning of a tool mounted on a machining apparatus without requiring a special skill.

The presetter in accordance with the present invention comprises a base table and at least one pair of regulating blocks provided on the base table so as to move in parallel with a major face of the base table adapted to hold a member to be subjected to adjustment therebetween. Each regulating block has a face for holding the member to be adjusted which includes a regulating face for positioning the member at a desired angle when the member is held by the pair of the regulating blocks. Therefore, in a position where the member is held by the pair of the regulating blocks, the member is positioned at an angle following the regulating faces. Conditions of the regulating faces are determined depending upon the desired positioning conditions. In a preferred embodiment, one pair of the regulating blocks is mounted on the base table so as to move along a given straight path on the major face of the base table. There are provided two pairs of the regulating blocks and the member to be adjusted is adapted to be held by the two pairs of the regulating blocks from two directions perpendicular to each other and positioned angularly. To adjust a space between each pair of regulating blocks, a space adjusting mechanism is provided for each pair of regulating blocks. The space between each pair of regulating blocks are variable by operating the space adjusting mechanism to hold the member to be adjusted between the holding faces of the respective regulating blocks. Since the regulating blocks are movable in given directions respectively in parallel with the base table, the member to be adjusted is held so as to follow the holding faces of the regulating blocks when the member is brought into engagement with each pair of the regulating blocks. As a result, the member is positioned following the conditions of the regulating faces.

Figure 2:
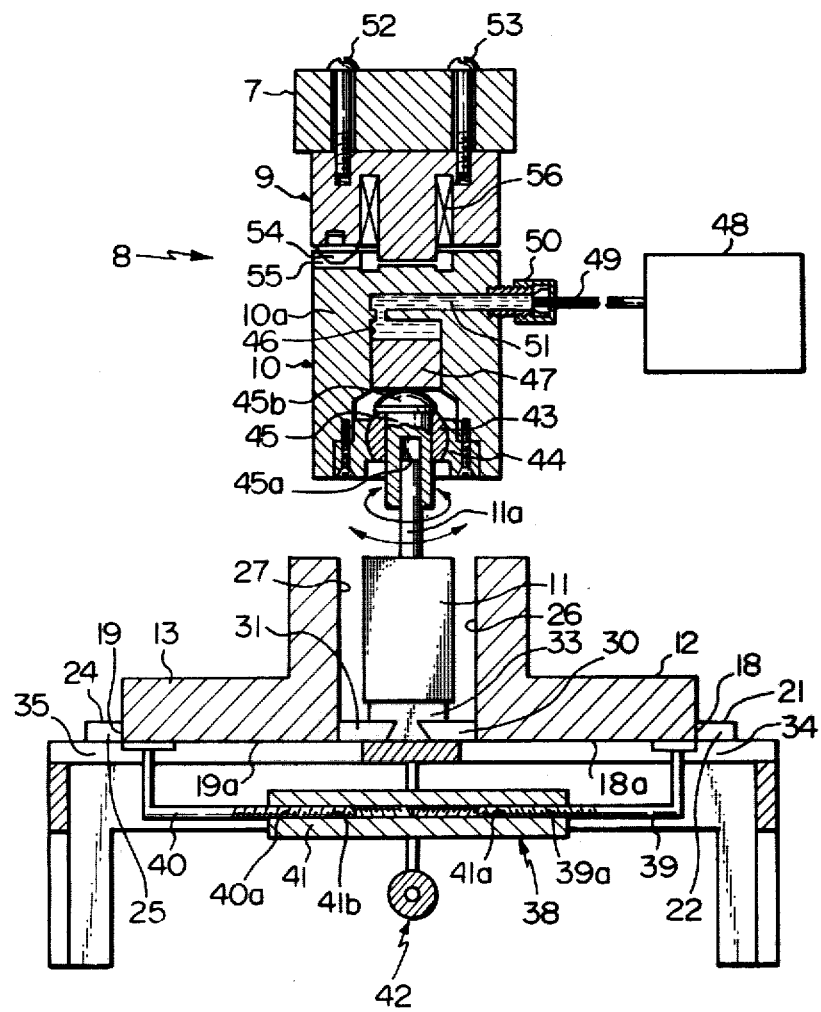

Other features and advantages of the invention will be apparent from the following description taken in conjunction with the accompanying drawings in which:

FIG. 1 is a perspective view of a presetter in accordance with the present invention; and FIG. 2 is a vertical sectional view taken along a line A—A in FIG. 1.

A presetter 1 of the present invention illustrated in FIG. 1 is a device usable for example to angularly position a tool such as a machining electrode for use in an electrical discharge machining apparatus. The presetter 1 comprises a base table 2 and a support device 3. The support device 3 comprises a support 4, a movable arm 7 having a dovetail 6 engageable with a dovetail groove 5 formed on the support 4 and vertically slidable along the dovetail groove 5, and a coupling device 8 fixed to a tip end of the movable arm 7. The coupling device 8 comprises, as will be described in detail later, a fixed member 9 fixed to the movable arm 7 and a removable member 10 adapted to mount a member to be adjusted thereon. In the embodiment illustrated, a machining electrode 11 for an electrical discharge machining apparatus is mounted, as a member to be adjusted, on the removable member 10 through an articulated joint. Therefore, the machining electrode 11 is articularly movable relative to the removable member 10.

In order to attain angular positioning by holding from a predetermined direction the machining electrode 11 supported by the support device 3 as mentioned above, there are provided a pair of regulating blocks 12 and 13 and another pair of regulating blocks 14 and 15. The regulating blocks 12 and 13 have dovetails 18 and 19, respectively, at respective bottom faces 16 and 17 thereof. The dovetail 18 is engaged with a groove 22 having a configuration corresponding to the dovetail 18 and the groove 22 is formed between guide plates 20 and 21 secured to a major face 2a of the base table 2 by screws. On the other hand, the dovetail 19 is engaged with a groove 25 (see FIG. 2) having a configuration corresponding to the dovetail 19 and the groove 25 is formed between guide plates 23 and 24 secured to the major face 2a of the base table 2 by screws. The grooves 22 and 25 are so arranged that a longitudinal axis of the groove 22 may be in alignment with a longitudinal axis of the groove 25. Thus, the pair of regulating blocks 12 and 13 are adapted to move along a straight line in conformity with the longitudinal axes of the grooves 22 and 25 and to move within a plane in parallel with the major face 2a of the base table 2. The pair of regulating blocks 12 and 13 have, on respective faces opposing to each other, regulating faces 26 and 27, respectively, for conforming the machining electrode 11 thereto. In the embodiment illustrated, the regulating faces 26 and 27 are perpendicular with respect to the major face 2a and they are parallel with each other.

Another pair of regulating blocks 14 and 15 are also adapted to move along the major face 2a of the base table 2 in parallel therewith by means of guide plates 28 and 29 and guide plates 30 and 31 in a manner similar to that of the regulating blocks 12 and 13. The direction of the movement is perpendicular to the longitudinal axes of the grooves 22 and 25. The pair of regulating blocks 14 and 15 have the regulating faces 32 and 33, respectively, which are perpendicular to the major face 2a and also perpendicular to the regulating faces 26 and 27.

In order to adjust a space between the regulating faces 26 and 27 of one pair of the regulating blocks 12 and 13 and a space between the regulating faces 32 and 33 of another pair of the regulating blocks 14 and 15, space adjusting devices are provided under the base table 2. To connect the space adjusting devices with the respective regulating blocks 12 to 15, cutouts 34, 36 and 37 are formed on the base table corresponding to grooves defined by the guide plates.

Referring now to FIG. 2, there is illustrated one space adjusting device 38 which is provided between a pair of blocks 12 and 13. The space adjusting device 38 comprises an L-shaped rod 39 having an end fixed through the cutout 34 to a bottom face 18a of the dovetail 18 of the regulating block 12, an L-shaped rod 40 having an end fixed through the cutout 35 to a bottom face 19a of the dovetail 19 of the regulating block 13, and an adjusting screw 41 which has female threads 41a and 41b meshable with male threads 39a and 40a of opposite directions formed on the other ends of the L-shaped rods 39 and 40. Therefore, when the adjusting screw 41 is rotated, the rods 39 and 40 are simultaneously screwed inwardly of the adjusting screw 41 and simultaneously screwed out of the screw 41. Thus, by rotating the adjusting screw 41, the space between the pair of the blocks 12 and 13 are adjusted while keeping the regulating faces 26 and 27 in parallel with each other. A space adjusting device 42 having a formation similar to that of the space adjusting device 38 is provided between the pair of the blocks 14 and 15 for the purpose similar to that of the device 38.

The removable member 10 includes a spherical member 43 and a seat 44 having a configuration corresponding to the contour of the spherical member 43. The machining electrode 11 is supported by the removable member 10 with a rod portion 11a thereof received in a recess 45a of a mounting member 45 fitted in the spherical member 43. An assembly of the spherical member 43 and the seat 44 is screwed on a body 10a of the removable member 10 as illustrated in FIG. 2 so that the machining electrode 11 is articulatedly connected to the removable member 10. To lock the spherical member 43, a pressing piston 47 is liquid-tightly and vertically movably provided in a cylinder portion 46 of the body 10a and a pressurized oil is supplied to the cylindrical portion 46 through a path formed by an oil pressure source 48, a pipe 49, a joint portion 50 and the body 10a. Therefore, when a pressure in the cylinder portion 46 is raised by the oil pressure, the pressing piston 47 comes to press against a head portion 45b of the mounting portion 45 to lock the spherical member 43.

The fixed member 9 is fixed to the movable arm 7 by bolts 52 and 53 and has conical lugs adapted to be received in V-shaped grooves formed on the removable member 10 for regulating a relative position between the removable member 10 and the fixed member 9. While three lugs and three V-shaped grooves are provided at angular intervals of 120°, only one of the lugs 54 and the V-shaped groove 55 received in the lug 54 appear in FIG. 2. By providing the conical lugs on the fixed member 9 at angular intervals of 120° and forming the V-shaped grooves extending radially at angular intervals of 120° on the removable member 10 for receiving the conical lugs respectively, the removable member 10 is readily mounted on the fixed member 9 with the axes thereof in alignment with each other. Numeral 56 designates an electromagnetic coil which is connected to a power supply cord 58 through a switch 57 illustrated in FIG. 1. Since the body 10a is made of a magnetic material, when the switch 57 is turned on to flow a required current through the electromagnetic coil after the removable member 10 has been mounted, the removable member 10 is locked to the fixed member 9 in the desired position.

An operation for carrying out an angular positioning of the machining electrode using the presetter in accordance with the present invention will now be described. First, the removable member 10 on which a desired machining electrode is mounted is fitted to the fixed member 9 and positioned relative thereto, and then the switch 57 is closed to lock the removable member 10. At this stage, no pressure is applied to the cylinder portion 46, leaving the pressing piston 47 free. Then, the height of the movable arm 7 is adjusted so as to position the machining electrode 11 so that it may confront the regulating faces of the regulating blocks. At this time, each pair of the regulating blocks are spaced more than the width of the machining electrode 11. The space adjusting devices 38 and 42 are then operated so that the electrode 11 may be held between the pair of the regulating blocks 12 and 13 and between the other pair of the regulating blocks 14 and 15. Therefore, the machining electrode 11 is held from two directions perpendicular to each other, when the four faces of the electrode 11 in the form of a square pillar follow the regulating faces 26, 27, 32 and 33, respectively. This is due to the specified structure such that each pair of regulating blocks are mounted on the base table 2 so as to move freely along the predetermined linear direction. Thus, the electrode 11 is so positioned as to be vertical with reference to the base table 2 and locked in the desired position by increasing the pressure in the cylinder portion 46 to depress the pressing piston 47.

After the electrode 11 has been positioned and locked, the removable member 10 is disengaged from the fixed member 9 and mounted on another fixed member identical with the fixed member 9 and preliminarily mounted on a quill of an electrical discharge machining apparatus (not shown) to readily mount the electrode 11 on the electrical discharge machining apparatus in the predetermined positioned state. Thus, the positioning of the machining eletrode is carried out outside of the electrical discharge machining apparatus and the so positioned electrode can be readily attached to the electrical discharge machining apparatus, exchange and positioning of machining electrodes can be carried out quickly and yet accurately. As a result, an effective operating time of the electrical discharge machining apparatus can be increased.

In the foregoing embodiment, the electrode 11 is mounted on the electrical discharge machining apparatus by once setting the electrode to the holding means separately provided from the electrical discharge machining apparatus to preliminarily accomplish the angular positioning of the electrode and then by using the coupling member 8. However, as can be understood from the foregoing description, the electrode actually mounted on the electrical discharge machining apparatus may be directly positioned by using the device as illustrated in FIG. 1. In this case, the presetter 1 is first mounted on a machining table of the electrical discharge machining apparatus and then the electrode mounted on the head is directly positioned in such a manner as mentioned above.

Although two pairs of regulating blocks are employed in the foregoing embodiment, two pairs of the regulating blocks are not always necessary and one pair of regulating blocks will suffice as can be understood from the above description. Of course, if desired, three or more pairs of regulating blocks may be employed. Furthermore, though the regulating faces of the regulating blocks are vertical with reference to the base table in the embodiment as mentioned above, they may have angles with reference to the base table according to desired angle of adjustment of the electrode to be subjected to the adjustment or may be contoured so as to conform to a shape of the electrode. Moreover, the presetter of the present invention may be widely used for general angular adjustment such as a setting angle adjustment of an electrode for an electropolishing apparatus or a gun for a welding machine as well as the setting angle adjustment of the electrode for the electrical discharge machining apparatus.

In accordance with the present invention, since required adjustment of the setting angle of the member to be adjusted can be achieved very simply, the setting operation can be carried out rapidly and the effective operating time can be greatly increased.

What is claimed is:

1. Apparatus for positioning an object to be adjusted in a desired angle, comprising:
   a base table;
   means for articularly supporting said object;
   a head portion on which said supporting means is removably mounted in a predetermined positional relationship, said head portion being mounted on said base table;
   at least one pair of regulating blocks having regulating faces respectively for positioning said object in a desired angle by holding said object therebetween;
   means for supporting and guiding said one pair of regulating blocks so as to be translatable on said base table in a predetermined direction; and,
   means for adjusting a space between said regulating faces, said adjusting means being connected to said one pair of regulating blocks for simultaneously moving said blocks.

2. Apparatus as claimed in claim 1 wherein said head portion has an electromagnetic coil for mounting said supporting means thereon by electromagnetic force.

3. Apparatus as claimed in claim 1 wherein said supporting means has means for fixing a positional relationship between said supporting means and said object after said object is adjusted in a predetermined angle.

4. Apparatus as claimed in claim 1 wherein said object is a machining electrode for an electrical discharge machining apparatus.

* * * * *